United States Patent
Pfeifer et al.

(10) Patent No.: US 12,140,459 B2
(45) Date of Patent: Nov. 12, 2024

(54) FLOW METER

(71) Applicant: WIKA Alexander Wiegand SE & Co. KG, Klingenberg (DE)

(72) Inventors: Fabian Pfeifer, Elsenfeld (DE); Andre Rother, Woerth am Main (DE); Juergen Pleyer, Stockstadt (DE); Alexander Will, Laudenbach (DE)

(73) Assignee: Wika Alexander Wiegand SE & Co. KG, Klingenberg/Main (DE)

( * ) Notice: Subject to any disclaimer, the term of this patent is extended or adjusted under 35 U.S.C. 154(b) by 422 days.

(21) Appl. No.: 17/400,969

(22) Filed: Aug. 12, 2021

(65) Prior Publication Data

US 2022/0049980 A1 Feb. 17, 2022

(30) Foreign Application Priority Data

Aug. 13, 2020 (DE) ...................... 10 2020 121 353.0

(51) Int. Cl.
*G01F 1/325* (2022.01)
*G01F 1/69* (2006.01)

(52) U.S. Cl.
CPC ............ *G01F 1/325* (2022.01); *G01F 1/3273* (2022.01); *G01F 1/69* (2013.01)

(58) Field of Classification Search
CPC ....... G01F 1/325; G01F 1/3259; G01F 1/3273
See application file for complete search history.

(56) References Cited

U.S. PATENT DOCUMENTS

| | | | | |
|---|---|---|---|---|
| 5,463,904 A | * | 11/1995 | Kalinoski | G01F 1/3218 73/861.24 |
| 6,170,338 B1 | * | 1/2001 | Kleven | G01F 15/024 73/861.22 |
| 10,066,976 B2 | | 9/2018 | Huang et al. | |
| 10,423,172 B2 | * | 9/2019 | Niederhauser | G01F 1/6842 |
| 2009/0301219 A1 | | 12/2009 | Oda et al. | |

FOREIGN PATENT DOCUMENTS

| | | | |
|---|---|---|---|
| DE | 3732856 A1 | 4/1989 | |
| DE | 102009029169 A1 | 3/2011 | |
| DE | 102011081922 A1 | * 2/2013 | ........... G01F 1/6845 |

OTHER PUBLICATIONS

Hedrich et al., DE 10 2011 081 922 A1, Feb. 2013, FIT Computer Translation (Year: 2013).*

* cited by examiner

*Primary Examiner* — Erika J. Villaluna
(74) *Attorney, Agent, or Firm* — Muncy, Geissler, Olds & Lowe, P.C.

(57) ABSTRACT

A flow meter for determining the flow velocity of a fluid in a media line, having a sensor base having a bluff body and a sensor body, an electronics unit and a signal interface. The bluff body is arranged substantially upstream of the sensor body in the direction of flow. The sensor body has a carrier part and a substrate arrangement having at least one ceramic substrate, and an anemometer sensor unit and a vortex meter sensor unit are arranged on the substrate arrangement.

22 Claims, 9 Drawing Sheets

FLOW METER

This nonprofessional application claims priority under 35 U.S.C. § 119(a) to German Patent Application No. 10 2020 121 353.0, which was filed in Germany on Aug. 13, 2020 and which is herein incorporated by reference.

BACKGROUND OF THE INVENTION

Field of the Invention

The present invention relates to a flow meter for determining a flow velocity of a fluid in a media line. The invention further relates to a method of installing such a flow meter in a media line.

Description of the Background Art

In the field of flow measurement, there are measuring devices for determining the flow velocity of liquid or gaseous fluids in media lines. Such measuring devices are referred to as flow meters in the following.

Flow meters from the prior art utilize various operating principles, each of which is advantageous in certain applications.

So-called vortex flow meters, also referred to as vortex meters in the following, take advantage of the fact that at a certain flow velocity, boundary layers detach themselves from flow-surrounded resistor bodies—also known as bluff bodies—in alternating directions of rotation. So-called Kármán vortex streets are formed. With a suitable sensor, a frequency at which the vortices detach can be detected. This frequency allows for the flow velocity to be determined.

The so-called thermal flow measurement makes use of the fact that heat is removed from a heat source by the flowing fluid. The heat removal depends on the flow velocity, in particular in the range of lower flow velocities. One variant of thermal flow measurement is thermal anemometry. Here, a heating element, usually a hot wire or a film resistor, is passed through with a heating current. The fluid flowing past causes heat to be removed, thus cooling the heating element. However, the heating current is controlled such that the heating element is kept at a constant, elevated temperature relative to the fluid temperature. A heating power required for this can be used to determine the fluid flow velocity. Typically, an anemometer also includes a non-heated temperature sensor to determine the current temperature of the fluid so that changes in fluid temperature can be accounted for in the control of the heating power.

From DE 37 32 856 A1, for example, an air flow meter is known which combines a vortex street air flow measurement, i.e., a vortex meter, with a hot wire air flow measurement, i.e., a thermal anemometer. The combination of these two measurement principles is intended to provide reliable measurement over a wide range of flow velocities. While hot-wire air volume measurement provides high measurement accuracy in the range of low flow velocities, but becomes increasingly inaccurate at higher flow velocities, the vortex street air volume measurement can be used to measure more accurately, especially at higher flow velocities. A particular disadvantage of the measuring system described is that it can only be used with gaseous fluids, such as air, due to the use of a hot wire.

For example, a vortex flow meter with a MEMS sensor (MEMS=Micro-Electro-Mechanical-System) is known from U.S. Pat. No. 10,066,976. This flow meter comprises a bluff body in which a small channel is embedded. Inside the channel a MEMS sensor is arranged, which comprises sensors for flow measurement using at least two different measuring principles. In this way, an expanded measuring range is to be captured, as also in the abovementioned document. However, the fine channel structure with the integrated MEMS sensor is susceptible to the accumulation of impurities, which is why such a flow meter is practically only suitable for use in clean gaseous media.

SUMMARY OF THE INVENTION

It is therefore an object of the present invention to provide a flow meter which is improved over the state of the art, which in particular can be manufactured inexpensively and which can be used flexibly, as well as a method for the installation of such a flow meter which can be carried out simply and inexpensively.

The flow meter according to an exemplary embodiment of the invention for determining the flow velocity of a fluid in a media line comprises at least one sensor base, comprising a bluff body and a sensor body. Furthermore, the flow meter comprises an electronics unit and a signal interface. The bluff body is arranged at least substantially upstream of the sensor body in the direction of flow. The sensor body comprises a carrier part and a substrate arrangement. The substrate arrangement in turn comprises at least one ceramic substrate. Furthermore, an anemometer sensor and a vortex meter sensor unit are arranged on the substrate arrangement, i.e., on the at least one ceramic substrate.

In this context, media line can mean any type of guide or spatial dimension restriction for a flowing medium, such as a channel, a pipeline, or even a surface through or across which a fluid flows. Due to its structure or components, the flow meter according to the invention is suitable for use in any of the exemplary media lines.

In the context of the present invention, a sensor base can be understood as an element of the flow meter that couples it to a part of the media line. A sensor base thereby allows for flexible use of the flow meter at a variety of measuring points, while achieving a tight and stable installation. The measuring point is the location where the flow meter is installed. If the measuring point is designed as a through-opening in the wall of a pipeline, for example, the sensor base can be designed as a flange or plug-shaped insert.

The bluff body can be designed as part of the sensor base or as an independent component which is held by the sensor base. These variants allow for a cost-effective design that can be flexibly adapted to a wide range of applications. The bluff body can be designed as a rod-shaped element. The bluff body has a longitudinal axis that extends, for example, from the sensor base into the flowing fluid. For a cross-sectional design of the bluff body, many suitable profiles are known from the prior art. For example, the cross-sectional shape may be a triangular shape with one side of the triangle oriented perpendicular to and opposite the direction of flow and the triangle formed symmetrically about an axis parallel to the direction of flow.

The sensor body can also be designed as part of the sensor base or as an independent component held by the sensor base. These variants allow for cost-effective designs that can be flexibly adapted to a variety of applications. For example, the sensor body can be designed as a paddle-shaped or narrow board-shaped body that has a longitudinal axis extending from the sensor base into the flowing fluid.

In this context, the fact that the bluff body is arranged essentially upstream of the sensor body in the direction of flow means, for example, that a volume element of the flowing fluid first passes the bluff body and only then the sensor body. The two bodies can be arranged along a line parallel to the direction of flow, for example. However, an arrangement of the bluff body deviating therefrom, at a location outside such a line in front of the sensor body, is also defined as substantially upstream in the sense of the invention, provided that the sensor body is not precluded by the arrangement from experiencing the effect of vortex formation behind the bluff body. This arrangement provides reliable measurement over a wide range of flow velocities.

An electronics unit in accordance with the invention includes, for example, any type of printed circuit board, conducting path, microelectronics and electronic components which is or are suitable for performing, alone or in combination, the control and measurement tasks required to realize the features of the present invention. Corresponding components may be arranged and interconnected on one or more printed circuit boards, for example on one or more encapsulated units. The electronics unit may be connected via conducting paths to both the anemometer sensor unit and the vortex meter sensor unit and may receive and evaluate electrical sensor signals from these units. Sensor signals may be measurable voltages, currents, capacitances, or frequencies. The electronics unit may have volatile or non-volatile memory. A power supply to the flow meter may be provided via electrical lines or electromagnetic fields from an external power source to the electronics unit. However, apart from this, the electronics unit may also have its own power source, such as an accumulator or battery. The electronics unit may be disposed within an interior of the sensor base or within a housing of the flow meter. A housing of the flow meter may be connected to the sensor base and arranged outside the media line.

A signal interface according to the present invention can be, for example, any device/transmitter for transmitting electrical or electromagnetic signals. Such a signal interface advantageously allows for measured values, error signals and other information to be flexibly transmitted from the flow meter to a variety of different receivers. Likewise, data from external transmitters can be received via the signal interface, for example calibration or configuration data. A signal interface can be formed, for example, by an electrical plug-in contact or a radio interface according to a known radio standard. The signal interface may be located within an interior, or adjacent to an interior of the sensor base, or within a housing or adjacent to a housing of the flow meter.

A carrier part in the sense of the invention is designed, for example, to receive or hold the substrate arrangement. In addition, the carrier part may serve to form an outer shape of the sensor body. Such a carrier part enables a simple, modular structure and cost-effective manufacture of the flow meter.

The substrate arrangement includes at least one ceramic substrate or an arrangement of multiple ceramic substrates that are bonded, glued, stacked, or separated from each other by other elements. Ceramic substrates are, for example, thin wafers of a ceramic material. For the purposes of the invention, ceramic substrates serve, for example, as carriers for the sensor units. Such substrate arrangements enable simple and inexpensive assembly as well as a high resistance of the elements to environmental influences.

In the context of the present invention, an anemometer sensor unit is understood to be, for example, any embodiment of a measuring element or any combination of embodiments of measuring elements, for example resistors or thermistors, which is suitable for carrying out the measuring principle of thermal anemometry.

In the context of the present invention, a vortex meter sensor unit is understood to be, for example, any embodiment of a measuring element or any combination of embodiments of measuring elements that is suitable for carrying out the measuring principle of vortex meter flow measurement.

By combining the aforementioned sensor units, a high measuring accuracy of the flow meter over a wide flow velocity range is made possible. In addition, the formation of the sensor units on the substrate arrangement enables cost-effective manufacture as well as high resistance to environmental influences.

For the following descriptions of advantageous further embodiments, in particular for the description of geometric arrangements, it is assumed that a flow direction of the flowing fluid runs in a horizontal direction, while the alignment of the flow meter or bluff body and sensor body is carried out in a direction at least substantially orthogonal thereto and assumed to be vertical. An arrangement of flow direction and orientation of the flow meter or bluff body and sensor body defined as at least substantially orthogonal to each other means that the longitudinal axes of the bluff body and sensor body at least do not run parallel to the flow direction. Any choice of flow direction or orientation of a flow meter that deviates from the horizontal and vertical is deemed to be equivalent according to this definition.

The anemometer sensor unit comprises a first thick-film resistor for determining a media temperature and a heated thick-film resistor for determining a flow-dependent power output. The first thick-film resistor and the heated thick-film resistor are arranged at a first distance from each other with respect to a vertical longitudinal axis of the sensor body.

The design of the anemometer sensor unit by means of thick-film resistors in conjunction with the substrate arrangement enables a cost-effective and resistant design of the sensor unit. The thick-film material is selected in such a way, for example, that the highest possible temperature coefficient is achieved, so that in turn a high measurement accuracy can be achieved.

In the context of this possible further development, media temperature means the temperature of the flowing fluid.

Furthermore, in the context of this possible further development, an arrangement of the resistors relative to each other at a first distance with respect to a longitudinal axis of the sensor body means that they are not arranged one behind the other in the direction of flow and that they do not overlap, for example. In this way, it can be achieved in an advantageous manner that local heating of the flowing fluid in the direct vicinity of the heated thick-film resistor has practically no influence on the measurement of the media temperature by the first thick-film resistor. This can increase the measurement accuracy of the anemometer sensor unit.

In the context of this possible further development, it is irrelevant whether the thick-film resistors are formed on a common substrate or two separate ceramic substrates.

The vortex meter sensor unit and the anemometer sensor unit can be arranged at a second distance from each other with respect to the vertical longitudinal axis of the sensor body. The vortex meter sensor unit may thereby be arranged at an end portion of the sensor body, remote from the sensor base.

An arrangement of the sensor units relative to each other at a second distance with respect to a longitudinal axis of the sensor body means that they are not arranged one behind the other in the flow direction and do not overlap, for example.

In this way, it can be advantageously achieved that the local heating of the flowing fluid in the immediate vicinity of the heated thick-film resistor of the anemometer sensor unit has practically no influence on the measurement of the vortex meter sensor unit. As a result, the measurement accuracy of the vortex meter sensor unit can be increased.

An arrangement of the vortex meter sensor unit at an end section of the sensor body means, for example, that, from the sensor base at the edge of the media line, the vortex meter sensor unit projects further into the fluid flow than the anemometer sensor unit. In this way, a particularly stable structure can be achieved in an advantageous manner since the sensor body has to project into the media line only far enough for the vortex meter sensor unit to be located in a region of sufficiently strongly formed vortices. As a result, the sensor body is exposed to less strong flow forces overall.

In the context of this possible further development, it is irrelevant whether the anemometer sensor unit and the vortex meter sensor unit are formed on a common ceramic substrate or on several separate ceramic substrates.

The heated thick-film resistor can be disposed on a ceramic substrate of the substrate arrangement that includes cross-sectional reductions. The cross-sectional reductions may be arranged with respect to a vertical longitudinal axis of the sensor body, for example, in a region of the first distance between the heated thick-film resistor and the first thick-film resistor, and/or in a region of the second distance between the entire anemometer sensor unit and the vortex meter sensor unit.

The cross-sectional reductions can effectively reduce heat conduction through the ceramic substrate, away from the heated thick-film resistor. Thus, by positioning cross-sectional reductions at the proposed points, namely, with respect to the longitudinal axis of the sensor body, between the resistors or between the sensor units, a heating of the first thick-film resistor and/or the vortex meter sensor unit due to the heat from the heated thick-film resistor can be significantly reduced. As a result, measurement accuracy and stability of measurement accuracy can be improved. Cross-sectional reductions can be realized in this context, for example, by lateral trapezoidal openings.

In the context of this further development, it is irrelevant whether the heated thick-film resistor, the first thick-film resistor and the vortex meter sensor unit are formed on a common ceramic substrate or on multiple separate ceramic substrates.

In another possible further development of the flow meter, the vortex meter sensor unit includes a pressure sensor.

A pressure sensor is suitable for reliable and accurate detection of the frequency at which vortices detach from the bluff body. In addition, a pressure sensor is inexpensive and easy to manufacture and assemble in conjunction with the substrate arrangement. In this context, the pressure sensor can be designed as a MEMS chip (MEMS=Micro-Electro-Mechanical-System). Furthermore, the pressure sensor can also be designed as a membrane that is provided with at least one strain-sensitive measuring element, which is integrated directly into a ceramic substrate of the substrate arrangement. Suitable strain-sensitive measuring elements are, for example, strain gauges or strain-sensitive resistor tracks on the membrane.

In another possible further development of the flow meter, the pressure sensor can be arranged on a ceramic substrate of the substrate arrangement which has a through-opening, wherein the pressure sensor is arranged above this opening. Further, the sensor body may have a clearance around the position of the pressure sensor. The clearance allows for the pressure sensor to receive and be exposed to the pressure of the flowing fluid. In particular, the opening and/or the clearance may be sealed with a flexible filling compound.

A through-opening in the sense of this further development means a continuous opening from one side of the ceramic substrate to the other side of the ceramic substrate. Such an opening is, for example, rectangular in shape or formed by a circular bore.

By arranging the pressure sensor over the through-opening, a pressure-sensitive element of the pressure sensor can detect pressure differences and pressure changes between both sides of the substrate and the sensor body. Without a corresponding through-opening, a pressure sensor designed, for example, as a MEMS pressure sensor with an integrated reference chamber can be arranged on the ceramic substrate and detects pressure changes on its surface.

In the context of this further development, arranging the pressure sensor on the ceramic substrate means, for example, gluing it on.

If the pressure sensor is formed as a membrane integrated into the ceramic substrate with at least one strain-sensitive measuring element on the membrane, then the ceramic substrate does not have a through-opening as defined above. Instead, the ceramic substrate has a material weakening, such as a milling out, at the location of the membrane or the membrane is formed thereby. Nevertheless, such an embodiment of the pressure sensor can be combined with a clearance of the sensor body as described above and below.

A clearance in the sense of this further development means such a shaping of the sensor body that the pressure sensor is not covered by the sensor body, for example by the carrier part. For example, in conjunction with a through-opening or a material weakening or milling out in the ceramic substrate forming a membrane, it can be achieved in this way that the pressure sensor is subjected to the pressure of the flowing fluid from both sides of the sensor body and assembly is at the same time simple and inexpensive.

A flexible filling compound can be used to fill the clearance and/or the through-opening in order to advantageously protect the pressure sensor from direct contact with the fluid. This allows for the flow meter to be used in a wide range of fluids, especially liquid media. At the same time, the flexibility of the filling compound means that the transmission of pressure to pressure-sensitive elements of the pressure sensor is not impeded. A silicone, for example, can be used as the flexible filling compound.

In another possible further embodiment of the flow meter, the substrate arrangement comprises at least two ceramic substrates, i.e., a first ceramic substrate and a second ceramic substrate. In this case, the heated thick-film resistor is arranged on the first ceramic substrate, and the first thick-film resistor and the vortex meter sensor unit are arranged on the second ceramic substrate.

By distributing the sensor units and/or resistors over the first and second ceramic substrates in such a manner, it can be advantageously achieved that the amount of heat transferred from the heated thick-film resistor to the first thick-film resistor and the vortex meter sensor unit is reduced.

Furthermore, in this further development, it may be provided that the ceramic substrates are arranged at least substantially parallel to each other. Here, "at least substantially parallel" means that the two substrates lie in two planes that are either truly parallel to each other or intersect at an angle of less than 90 degrees.

Further, in this further development, it may be provided that the carrier part is disposed between the two ceramic substrates, for example is disposed in sections between the ceramic substrates. In this way, the carrier part can advantageously help to further reduce heat conduction between the heated thick-film resistor on the first ceramic substrate and the elements arranged on the second ceramic substrate. In addition, the structure can be made to be particularly compact, cost-effective, and robust in this way, as the carrier part supports, holds and/or stabilizes the ceramic substrates.

Furthermore, this further development of the flow meter can be combined in an advantageous manner with the possible further developments mentioned above. For example, it can be provided that the first ceramic substrate has cross-sectional reductions which are arranged in the region of the first distance with respect to the vertical longitudinal axis. The second ceramic substrate may, for example, have a through-opening above which a vortex meter sensor unit designed as a pressure sensor is arranged.

In another possible further development of the flow meter, the ceramic substrates of the substrate arrangement and elements arranged thereon are coated with a protective layer. This protective layer can be formed as a thick-film glaze and/or applied by the so-called sol-gel method.

By using such a protective layer, a particularly cost-effective protection of the flow meter against liquid media influences can be achieved.

In a further possible further development of the flow meter, the carrier part has recesses on its side surfaces which are aligned at least substantially orthogonally to the direction of flow, wherein the ceramic substrates of the substrate arrangement are inserted or pushed into these recesses.

In the context of this further development, "at least substantially orthogonal to the direction of flow" means that the ceramic substrates, inserted or pushed into the recesses, are at least not perpendicular to the direction of flow due to their orientation, in particular have a surface parallel to the direction of flow.

By means of this further development, it can be achieved in an advantageous manner that the structure of the sensor body is particularly robust and at the same time can be designed simply and inexpensively. In this further development, the carrier part can hold or support the ceramic substrates in a particularly stable manner and thus increase the mechanical stability of the structure. At the same time, e.g., in connection with the above-mentioned possible further development with the first and second ceramic substrate, a total of only three parts are thus necessary to form the sensor body. These parts are the first ceramic substrate, the second ceramic substrate and the carrier part. This allows for low-cost manufacturing.

The recesses are designed, for example, in the form of depressions which are adapted to the contour of the ceramic substrates. This allows for the ceramic substrates to be easily inserted into the recesses. Optional fastening means, e.g., latching lugs, can ensure that the ceramic substrates are held firmly in the recesses. Alternatively, the recesses can also be designed with undercuts so that the ceramic substrates can be inserted into them. Furthermore, recesses can also be shaped as pockets, for example in sections, so that ceramic substrates accommodated therein are held in a particularly stable manner, for example also protected from direct contact with the flowing fluid.

In another possible further development of the flow meter, the sensor base and/or the bluff body and/or the carrier part are made of a plastic by injection molding. The plastic can in particular be designed to be thermally and electrically insulating and/or selected from the material class of fiber composites.

This further development makes it possible to achieve particularly cost-effective production. In addition, the components can be designed in an advantageous manner to resist environmental influences and at the same time with low weight. In conjunction with the aforementioned further developments, a carrier part according to this further development can in particular fulfill its function of thermally insulating the first ceramic substrate (with the heated thick-film resistor) from the second ceramic substrate in a particularly effective manner.

The material class of fiber composites also offers high mechanical stability and resistance, which can be used advantageously in the flow meter.

In another possible further development of the flow meter, the sensor body has an oval cross-sectional contour, at least in sections and at least on the side facing the flow, wherein this contour is elliptical or circular, for example.

In the context of this further development, the cross-sectional contour refers to a section which is laid through the sensor body perpendicular to the vertical longitudinal axis of the sensor body. Further, the designated side may be the one which faces the bluff body. However, for example, it is to be understood as the side of the sensor body which is first passed by a volume portion of the flowing fluid, or which is first encountered by a volume portion of the flowing fluid.

The fact that the cross-sectional contour is oval at least in sections may further mean that the oval contour does not extend along the entire vertical longitudinal axis of the sensor body or that it changes its shape along this longitudinal axis. For example, the oval cross-sectional contour may have a radius of curvature that decreases from the sensor base toward a lower end portion of the sensor body. Furthermore, the side facing away from the designated side may be symmetrical to the latter or may also have a cross-sectional contour deviating therefrom, for example a rectangular shape.

Such a shape means that the sensor body causes fewer vortices and less turbulence in the fluid. This, in turn, can contribute to the sensor body being subjected to less strong pressure forces due to the flow, and to less vibration due to vortices detaching in alternating directions of rotation. The flow resistance of the sensor body can be significantly reduced by the latter, possible further development.

In another possible further embodiment of the flow meter, the sensor base, the bluff body, and the sensor body are formed in one piece. Thus, they are formed of one piece, and are integrally or permanently connected to each other.

As a result, the flow meter can be manufactured particularly inexpensively, and the structure can be designed simply. This further development is particularly advantageous in conjunction with the above-mentioned production of the components by injection molding.

As an alternative to the last-mentioned further development of the flow meter, in another possible further development it can also be designed in such a way that the sensor base, bluff body and/or sensor body are separate parts, and the sensor base has sockets for receiving and holding the bluff body and/or the sensor body.

For example, the sensor base has two sockets, wherein the first socket receives and holds the bluff body, and the second socket receives and holds the sensor body.

Alternatively, the sensor base can only have a socket in which the bluff body is received and held. The bluff body itself can have a socket in which the sensor body is received and held.

The sockets in the sense of this further development thus correspond to openings between the interior space of the media line and an interior space of the sensor base or the space surrounding the media line. However, due to the bluff body and/or sensor body, which is or are received and held in the sockets, these are closed in a media-impermeable manner.

Furthermore, the sockets in the sense of this further development can be sealed in particular by seals, such as O-rings or molded seals, or by a form fit towards the bluff body and/or sensor body. Not only can this prevent the fluid from escaping from the media line and entering the sensor base, but a stable structure can also be achieved in this way.

In a further possible further development of the flow meter, the bluff body and/or the sensor body is or are displaceably mounted in the sockets. A displacement of the bodies is possible, for example, relative to the sensor base, at least substantially orthogonal to the flow direction and at least substantially parallel to a longitudinal axis of the sensor body and/or bluff body.

By means of such mounting, it can be advantageously achieved that the immersion depth of the bluff body and/or the sensor body are flexibly adjustable, e.g., can be adapted to the geometry of the media line.

In the context of this further development, immersion depth describes how far the bluff body and/or sensor body project from the sensor base into the flowing fluid and/or into the media line. For example, it can be provided for the immersion depth of the bluff body to be adapted to the diameter of the media line in order to achieve the most uniform flow possible. The immersion depth of the sensor body can, for example, be aligned with a distance to the center of the flow, i.e., for example, half the diameter of the media line.

Furthermore, the flow meter can have a fixing device which is set up to rigidly connect the displaceably mounted bluff body and/or the displaceably mounted sensor body to the sensor base. In a rigid connection, the bluff body and/or the sensor body are then no longer displaceable.

In this way, it can be advantageously achieved that the immersion depth of the bluff body and/or sensor body can be flexibly adjusted by the displaceable mounting, but when the immersion depth is suitably adjusted, the relative position of the bluff body and/or sensor body to the sensor base can be fixed and the flow meter thus forms a stable structure. Such a fixation can be reversible, so that the immersion depth can be adjusted again and again.

In another possible further development of the flow meter, the fixing device comprises reservoirs which are filled with a potting compound, for example with a two-component potting compound. The reservoirs can be arranged in such a way that, when the reservoirs are broken open, the potting compound flows automatically, for example due to gravity, into the sockets and solidifies therein in a sealing manner. Solidification may occur by contact and reaction with the surrounding air or, in the case of a two-component potting compound, by a mixing and reaction of the components. Such an embodiment of the fixing device allows for permanent, particularly resistant fixing and simultaneous sealing of the sockets.

Reservoirs in the sense of this further development are, for example, closed plastic pockets or bubbles which have a thin wall. The thin wall can be broken open, for example, with the aid of tools such as a screwdriver.

In another possible further development of the flow meter, the electronics unit is set up to detect the sensor signals from the anemometer sensor unit and the vortex meter sensor unit and, depending on the sensor signals, to assign them to a low velocity measuring range, an overlap measuring range or a high velocity measuring range.

In terms of measuring range, a vortex meter sensor unit typically has a characteristic measurement inaccuracy that decreases with increasing flow velocity. That is, at higher flow velocities, vortex meter sensor units measure very accurately. Thus, for the purposes of this further development, a high velocity measuring range can be understood as a high flow velocity measuring range in which the vortex meter sensor unit has a low measurement inaccuracy. Thermal anemometer sensor units, on the other hand, typically exhibit the opposite behavior. That is, at low flow velocities, they exhibit very low measurement inaccuracy, which, however, increases as flow velocity increases at the end of the measuring range. For the purposes of this further development, a low flow velocity measuring range can be understood as one in which the anemometer sensor unit has a low measurement accuracy. A medium flow velocity measuring range in which both the anemometer sensor unit and the vortex meter sensor unit have low measurement accuracy may be referred to as an overlap measuring range. According to the literal sense, the overlap measuring range may be the overlap of the low velocity and high velocity measuring ranges. However, it is also possible for the overlap measuring range to be defined as a range between the other ranges if the other ranges do not overlap, or as a point value if the low velocity and high velocity measuring ranges touch only in a limit value.

In the sense of this further development, the electronics unit can assign the sensor signals to one of the mentioned measuring ranges or flow velocity ranges on the basis of said sensor signals and thus determine with which measuring accuracy the sensor units are currently operating. This advantageously opens up options for intelligent control and optimization of the operation of the flow meter by the electronics unit, which options are the subject of the following further developments.

The assignment can be made in particular on the basis of reference data and/or calibration data stored in the flow meter. The assignment can be made on the basis of a single sensor signal, on the basis of both sensor signals or on the basis of a ratio between the two sensor signals.

In another possible further development of the flow meter, the electronics unit is set up to evaluate the sensor signal of the anemometer sensor unit in the low velocity measuring range and to provide it as a measured value signal via the signal interface, and to evaluate the sensor signal of the vortex meter sensor unit in the high velocity measuring range and to provide it as a measured value signal via the signal interface.

The evaluation of a sensor signal means that a measured value signal is calculated from the sensor signal according to a specific evaluation rule. Separate evaluation rules can be stored in the electronics unit for the anemometer sensor unit and for the vortex meter sensor unit, respectively, which are set, for example, during an adjustment.

This further development allows for the measurement accuracy of the flow meter to be optimized, since the signal of the sensor unit having the lowest measurement inaccuracy in the respective flow velocity range due to its respective characteristics is evaluated and output.

In another possible further development of the flow meter, the electronics unit is set up to evaluate the sensor signals of the anemometer sensor unit and the vortex meter sensor unit together in the overlap measuring range and to provide them as a resulting measured value signal via the signal interface.

In the context of this further development, the fact that the sensor signals are evaluated together means that both sensor signals are captured and calculated together to determine the resulting measured value. The calculation can be an averaging of the respectively determined measured values, for example a weighted averaging. Here, a weighting factor wA can be assigned to the measured value determined from the sensor signal of the anemometer sensor unit and a weighting factor wW=(1−wA) can be assigned to the measured value determined from the sensor signal of the vortex meter sensor unit. The weighting factor wA can be determined dynamically and, for example, assume the value wA=1 at the lower limit of the overlap measuring range, assume the value wA=0 at the upper limit of the overlap measuring range and, in between, follow, for example, a function which depends on one of the two sensor signals or both sensor signals and assumes values between 1 and 0. In the simplest case, this function is a straight line which falls linearly over the overlap measuring range from the initial value 1 to the final value 0.

By means of this further development, a smooth transition from the low velocity to the high velocity measuring range can be achieved via the overlap measuring range, wherein a low measurement accuracy across all ranges is achievable.

In a further possible further development of the flow meter, the electronics unit is set up to evaluate the sensor signals of the anemometer sensor unit and the vortex meter sensor unit together in the overlap measuring range and to align the sensor signal of the anemometer sensor unit with the sensor signal of the vortex meter sensor unit and/or to adaptively adjust signal deviations of the anemometer sensor unit to the vortex meter sensor unit in the overlap measuring range for the low velocity measuring range.

In the context of this further development, the fact that the sensor signals are evaluated together means that both sensor signals are detected and, in particular, also evaluated according to their respective evaluation instructions.

If the sensor signal of the anemometer sensor unit is aligned/synchronized with the sensor signal of the vortex meter sensor unit, this means that the electronics unit only evaluates the sensor signal of the vortex meter sensor unit to a measured value signal and provides it via the signal interface. The sensor signal of the anemometer sensor unit, on the other hand, is only compared with the sensor signal of the vortex meter sensor unit, and/or the measured values of the two sensor units are compared, and/or a possible signal deviation or measured value deviation is determined.

If signal deviations between the anemometer sensor unit and the vortex meter sensor unit in the overlap measuring range are adjusted adaptively for the low velocity measuring range, this means that the evaluation rule, according to which the sensor signal of the anemometer sensor unit is evaluated to a measured value or measured value signal, is adjusted in such a way that it is matched/equalized in the overlap range with the current evaluated measured value or measured value signal of the vortex meter sensor unit. In this way, long-term signal changes, so-called drifts, of the anemometer sensor unit can be compensated, which can be caused, for example, by deposits on the thick-film resistors.

This adaptive adjustment process can, for example, be combined with and/or triggered by the aforementioned alignment of the sensor signals. If a deviation between the anemometer sensor unit and the vortex meter sensor unit is detected over a time interval over which both signals are stable (and thus the signal deviation or measured value deviation is not due to a different response speed) and if this deviation is greater than a predefined limit value, an adaptive adjustment process is automatically performed.

Thus, in an advantageous way, a reliable function and measuring accuracy of the flow meter can be maintained over the entire measuring range and the flow meter must be removed less frequently for calibration, cleaning, or adjustment.

In another possible further development of the flow meter, the electronics unit is set up to evaluate the sensor signals of the anemometer sensor unit and the vortex meter sensor unit together and to determine, with the aid of plausibility data stored in the electronics unit, that one of the two sensor units is defective. If a defect is detected, an error signal can be output via the signal interface.

In the context of this further development, the fact that the sensor signals are evaluated together means that both sensor signals are captured and in particular compared with each other. Plausibility data in the sense of these further developments are data and limit values stored in the electronics unit, in particular tolerance ranges and value tables for the sensor signals or a difference between the sensor signals, which indicate normal functioning of the sensor units.

By means of this further development, it can be advantageously achieved that the flow meter independently monitors its function and can detect and signal a malfunction. This means that errors can be detected more quickly.

In particular, it can be provided that the plausibility data are determined by the flow meter itself in a so-called teach-in phase, for example during commissioning of the flow meter. The electronics unit can be set to a teach-in operating state via a corresponding control signal via the signal interface, in which it continuously evaluates the sensor signals together and derives corresponding plausibility data from the evaluation. Once sufficient plausibility data has been collected, the electronics unit can switch to a normal measuring operating state. During the teach-in phase, the sensor signals and/or measured value signals can be monitored by a control unit to ensure that there is no defect in one of the sensor units already during the teach-in phase.

In another possible further development of the flow meter, the electronics unit is set up to evaluate the sensor signals of the anemometer sensor unit and the vortex meter sensor unit together and to receive information about the flow velocity of the fluid via the signal interface. From the information and the sensor signals of the anemometer sensor unit and vortex counter sensor unit, the electronics unit can calculate a property of the fluid and output it via the signal interface. This property is, for example, a density, a viscosity, or a thermal conductivity of the fluid.

Thus, the flow meter is also flexibly suitable for measuring quantities other than flow velocity and can provide valuable information about a process medium when used in the process industry, for example. A calculated property of the fluid can be specified with particularly high accuracy if the flow velocity is not constant during the evaluation of the sensor signals, but is varied within an interval, for example within an interval that includes the overlap range.

In another possible further development of the flow meter, the electronics unit is set up to temporarily increase a heating power at the heated thick-film resistor in such a way that the sensor body is at least partially freed from organic deposits.

This advantageously prevents the sensor signal from being influenced by deposits on the heated thick-film resistor, as already described in previous sections. Reliable function and measuring accuracy of the flow meter can thus be maintained over a longer period of time and the flow meter must be removed less frequently for calibration, cleaning, or adjustment.

It can also be provided that the first thick-film resistor is temporarily switched from a measuring mode to a heating mode by the electronics unit and that the first thick-film resistor is also connected with increased heating power in this heating mode, so that organic deposits can also be at least partially removed.

In the method according to the invention for installing a flow meter at a measuring point of a media line, the sensor base is arranged at the measuring point. In this context, arranging means, for example, screwing into a threaded socket, gluing in, welding on, or establishing a flange connection. As soon as the sensor base is stably and sealingly arranged at the measuring point, the bluff body is inserted from outside the media line into a socket of the sensor base and introduced into the media line. In the process, the bluff body is inserted, for example, so deeply that it touches the inner wall of the media line opposite the sensor base. In a next step, the sensor body is inserted into the media line from outside the media line through another socket of the sensor base or the bluff body. Here, the sensor body is inserted, for example, so deeply that an end section of the sensor body is located in the center of the flow, for example, in the center of the media line. In a further step, the bluff body and the sensor body are rigidly connected to the sensor base by a fixing device.

This method allows for the flow meter to be installed extremely quickly and thus cost-effectively. At the same time, individual adaptation to the dimensions of the media line, i.e., in particular to the diameter of the media line, is possible.

The flow meter according to the invention and its further developments are described in the previous sections for determining a flow velocity in flowing fluids in general, i.e., in gaseous as well as in liquid flowing media. However, the flow meter according to the invention as well as its possible further developments can also be used in fluid media, since its modular and stable design allows for a high mechanical load capacity and tightness. The flow meter can thus also withstand increased forces transmitted by a flowing liquid as compared to a flowing gas.

In addition, the flow meter according to the invention and its possible further developments are also suitable for use in flows which have both liquid and gaseous flow components. In a primarily gaseous flowing medium, the flow meter can also be used if short-term and impulsive liquid flows are to be expected. Such impulsive liquid flows, on the other hand, would damage the flow meters for gases known from the prior art, especially their sensitive measuring elements, such as hot wires.

It is also possible to use the flow meter according to the invention and its possible further developments in a primarily liquid flowing medium, if short-term and impulsive gas flows or gas bubbles are to be expected. The stable structure of the flow meter can withstand the fluctuations in mechanical loads that occur in this case. The sensor units formed on the substrate arrangement can also be operated reliably under such load fluctuations. In accordance with the further developments of the flow meter, the first thick-film resistor and the heated thick-film resistor of the anemometer unit in particular can be capable of withstanding the drop in heat dissipation associated with a change from a liquid to a gaseous phase, i.e., not burn up as a result, for example, as can be the case when a hot wire is used.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
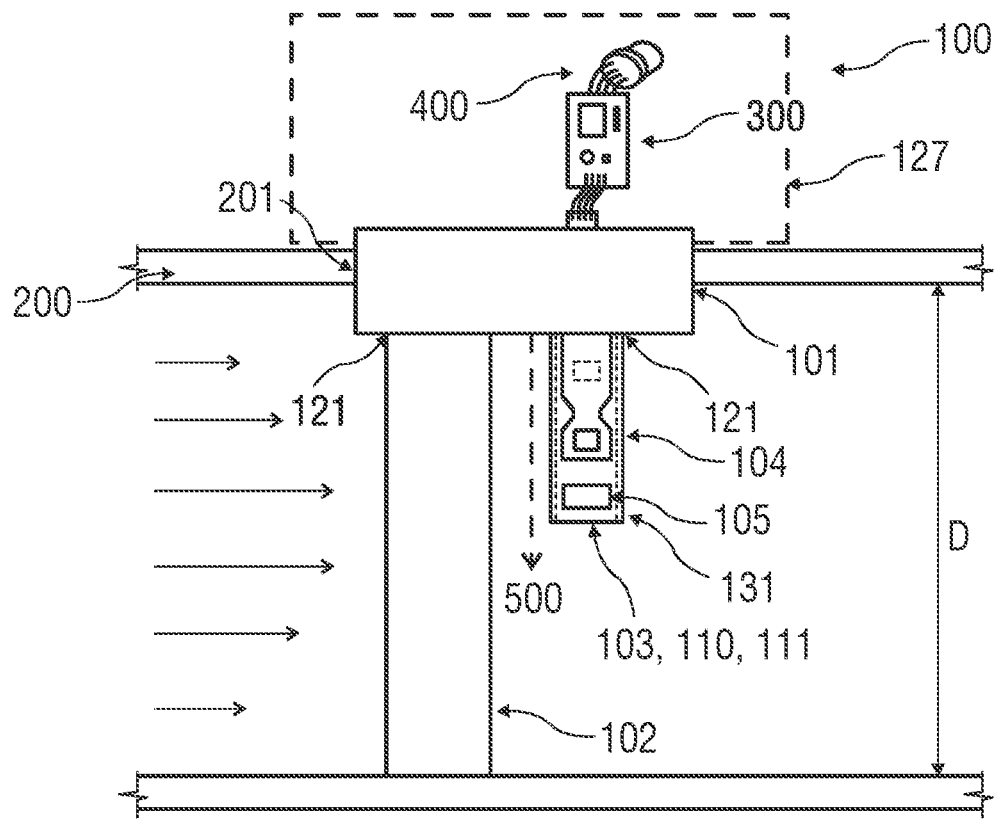
FIG. 1 shows a schematic view of a flow meter in a media line.

FIG. 1 shows an exemplary embodiment of a flow meter 100, which combines features of several of the possible further developments of the flow meter 100 according to the invention described above.

The flow meter 100 is arranged at a measuring point 201 of a media line 200. A flow velocity profile of the fluid in the media line 200 is schematically indicated by arrows on the left side of the media line 200.

The flow meter 100 comprises a sensor base 101, a bluff body 102, the immersion depth of which corresponds substantially to the diameter D of the media line 200, and a sensor body 103 with a carrier part 110, a substrate arrangement 111, an anemometer sensor unit 104 and a vortex meter sensor unit 105. The vortex meter sensor unit 105 is arranged in the region of an end section 131 of the sensor body 103. An immersion depth of the sensor body 103 corresponds at least substantially to half the diameter D of the media line 200, wherein the sensor body 103 is arranged downstream of the bluff body 102 in the flow direction. A vertical longitudinal axis 500 of the sensor body 103 is shown as a dashed arrow.

An electronics unit 300 is in communication with the sensor units 104, 105 and a signal interface 400 via electrical lines. The signal interface 400 is shown as a plug-in contact by way of example. The electronics unit 300 and the signal interface 400 are arranged within a dashed housing 127 of the flow meter 100. The bluff body 102 and the sensor body 103 are received and held in sockets 121 of the sensor base 101. The exemplary embodiment, by its features and components, achieves the advantages set forth accordingly in the above description of the invention.

Figure 2:
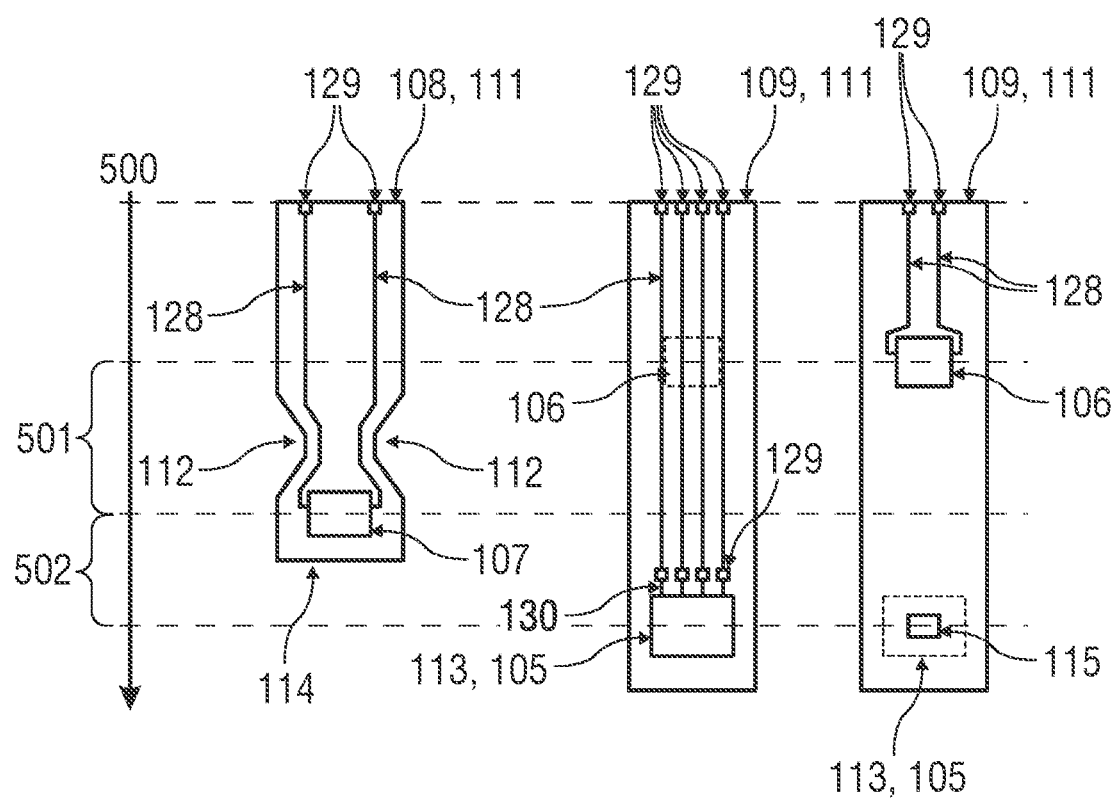
FIG. 2 shows a schematic view of ceramic substrates.

FIG. 2 shows on the left an exemplary embodiment of a substrate arrangement 111 having a first ceramic substrate 108, and on the right, a front and back side of an exemplary embodiment of a substrate arrangement 111 having a second ceramic substrate 109. The ceramic substrates 108, 109 are shown at the same scale and in relation to a common longitudinal axis 500 of the sensor body 103.

A heated thick-film resistor 107 is disposed on the first ceramic substrate 108 in the region of a lower end portion 114 of the first ceramic substrate 108. This is connected to contacts 129 at the upper end of the first ceramic substrate 108 via conductive paths 128.

Above the heated thick-film resistor 107, the first ceramic substrate 108 has cross-sectional reductions 112. These reduce the amount of heat that can propagate upward from the heated thick-film resistor 107. With respect to the drawn vertical longitudinal axis 500 of the sensor body 103, the cross-sectional reductions 112 are disposed in the region of a first distance 501 located between a position of the heated thick-film resistor 107 and a position of the first thick-film resistor 106. A second distance 502 is formed between the position of the heated thick-film resistor 107 and a position of the vortex meter sensor unit 105.

As shown in the middle figure, on one side the second ceramic substrate 109 carries the vortex meter sensor unit 105, which is an exemplary pressure sensor 113. The pressure sensor 113 is, for example, a MEMS chip. The pressure sensor 113 is bonded to the second ceramic substrate 109 via a through-opening 115 of the second ceramic substrate 109. Bond wires 130 connect the pressure sensor 113 to contacts 129 provided for this purpose. These, in turn, are connected by conductive paths 128 to contacts 129 at the upper edge of the second ceramic substrate 109. These in turn may be connected to the electronics unit 300.

On its other side, as shown on the right side of the figure, the second ceramic substrate 109 carries the first thick-film resistor 106, which is also electrically conductively connected via conductive paths 128 to contacts 129 at the top of the second ceramic substrate 109. By means of the through-opening 115, the bottom of the pressure sensor 113 is partially exposed so that the pressure sensor 113 can receive pressure from both sides of the second ceramic substrate 109.

Figure 3A:
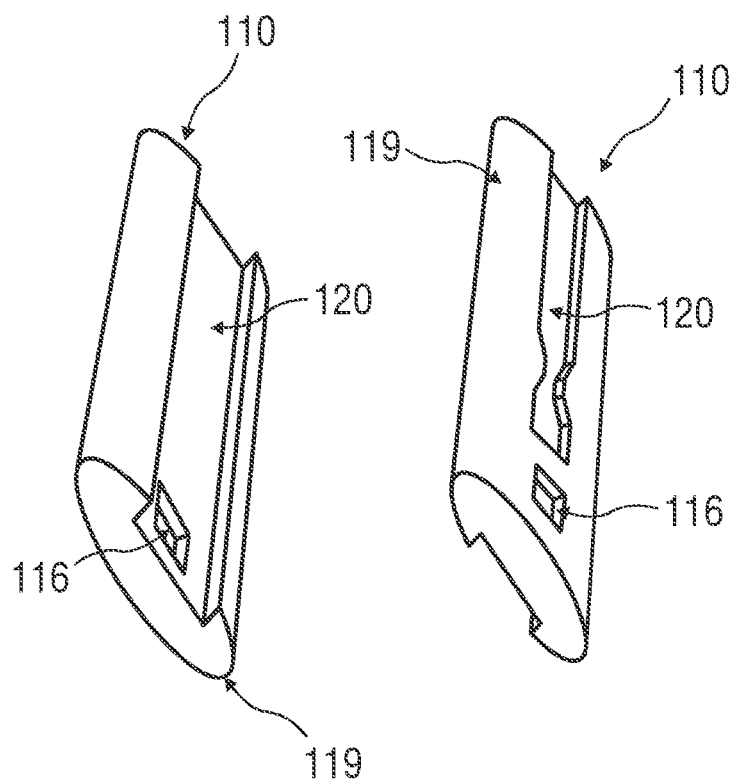
FIG. 3A to 3C show a schematic view of a carrier part and cross-sections through a sensor body.

FIG. 3A shows an exemplary embodiment of a carrier part 110 in two perspective views.

The carrier part 110 forms a side surface 119 of the sensor body 103, which faces the flow of the fluid. The side surface 119 has an oval cross-sectional contour. Both surfaces facing perpendicular to the flow have recesses 120 into which ceramic substrates 108, 109 can be inserted or pushed. Furthermore, the carrier part 110 has a clearance 116.

Figure 3B:
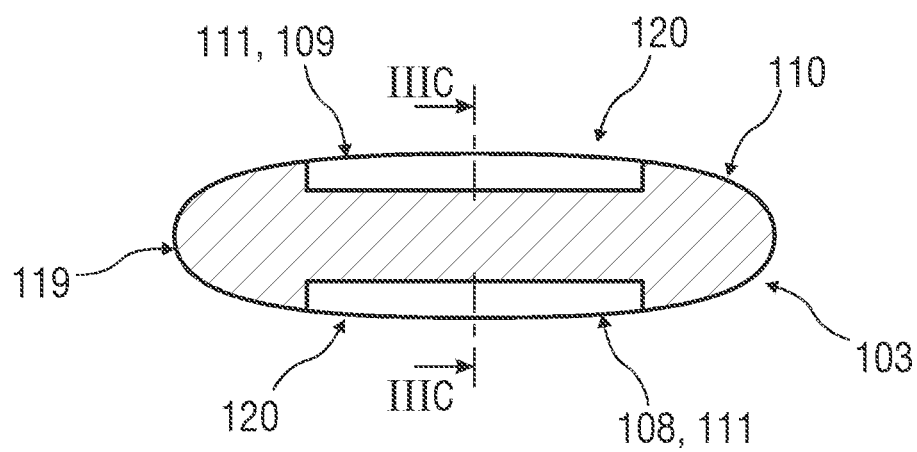

FIG. 3B shows a cross-sectional view of an exemplary embodiment of a sensor body 103, perpendicular to a vertical longitudinal axis 500 of the sensor body 103, comprising a carrier part 110 and a substrate arrangement 111.

The carrier part 110 has a side surface 119 facing the flow, which is designed with an oval cross-sectional contour. Adjacent side surfaces have recesses 120 into which a first ceramic substrate 108 and a second ceramic substrate 109 are inserted or pushed.

Figure 3C:
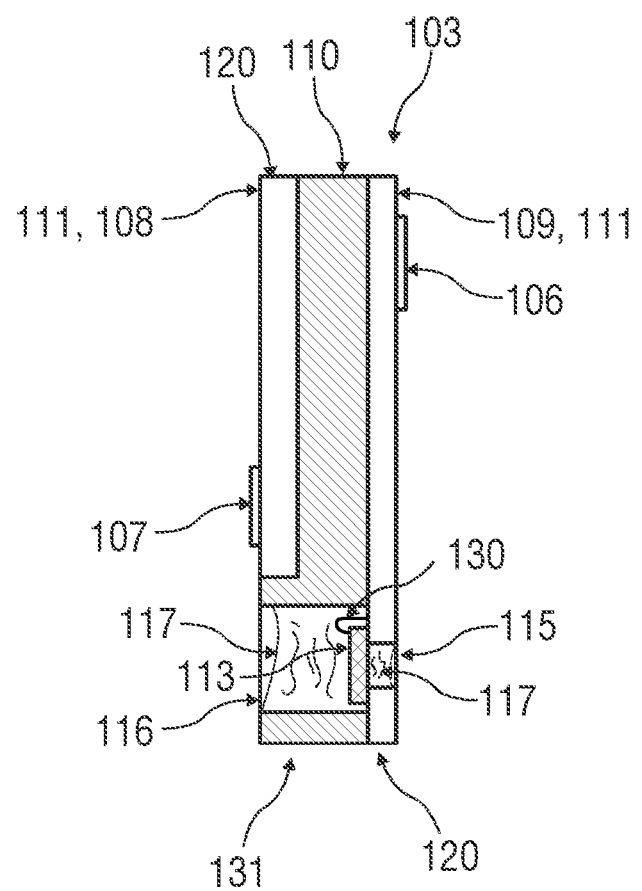

FIG. 3C shows a section X, as indicated in FIG. 3B, through an exemplary embodiment of a sensor body 103, along a vertical longitudinal axis 500 of the sensor body 103.

A first ceramic substrate 108 and a second ceramic substrate 109 are received or inserted into recesses 120 of a carrier part 110 of the sensor body 103.

A heated thick-film resistor 107 is disposed on the first ceramic substrate 108. A first thick-film resistor 106 is disposed on the second ceramic substrate 109, on the side of the ceramic substrate 109 facing outwardly toward the fluid.

A pressure sensor 113 is arranged at an end section 131 of the sensor body 103 in the region of a clearance 116 of the carrier part 110, on the other side of the second ceramic substrate 109. This is connected by bond wires 130 to contacts 129 on the substrate, which are not shown.

The second ceramic substrate 109 further includes a through-opening 115 within a surface portion on which the pressure sensor 113 is disposed. The clearance 116 and the opening 115 are filled with a flexible filling compound 117 that protects both sides of the pressure sensor 113 from direct contact with the fluid but does not hinder the obtainment of pressure from either side of the sensor body 103.

Figure 4A:
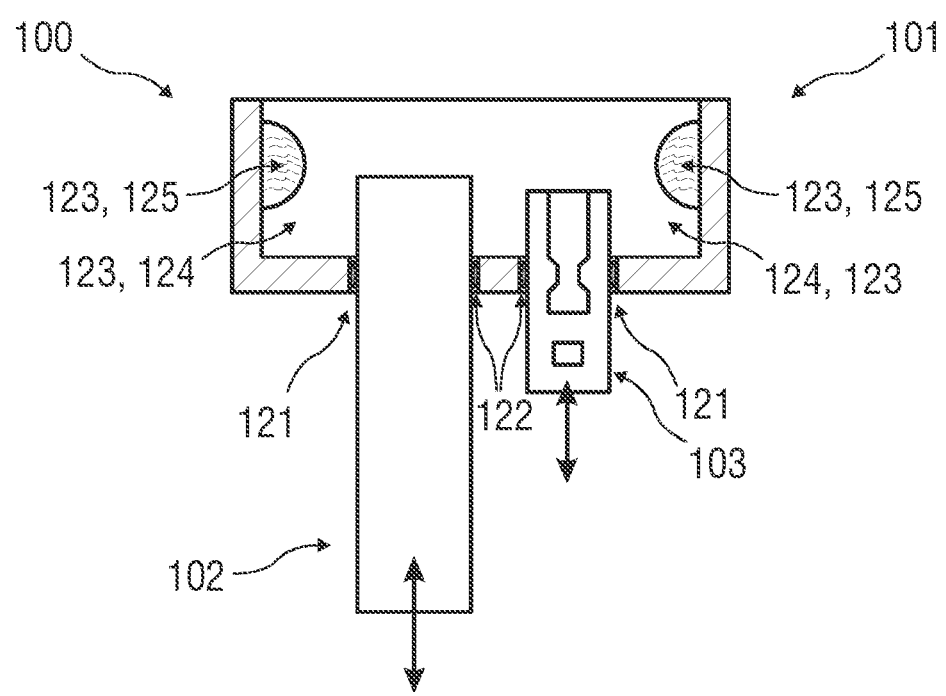
FIG. 4A to 4C show a schematic view of three sub-steps of a method for installing a flow meter.
Figure 4B:
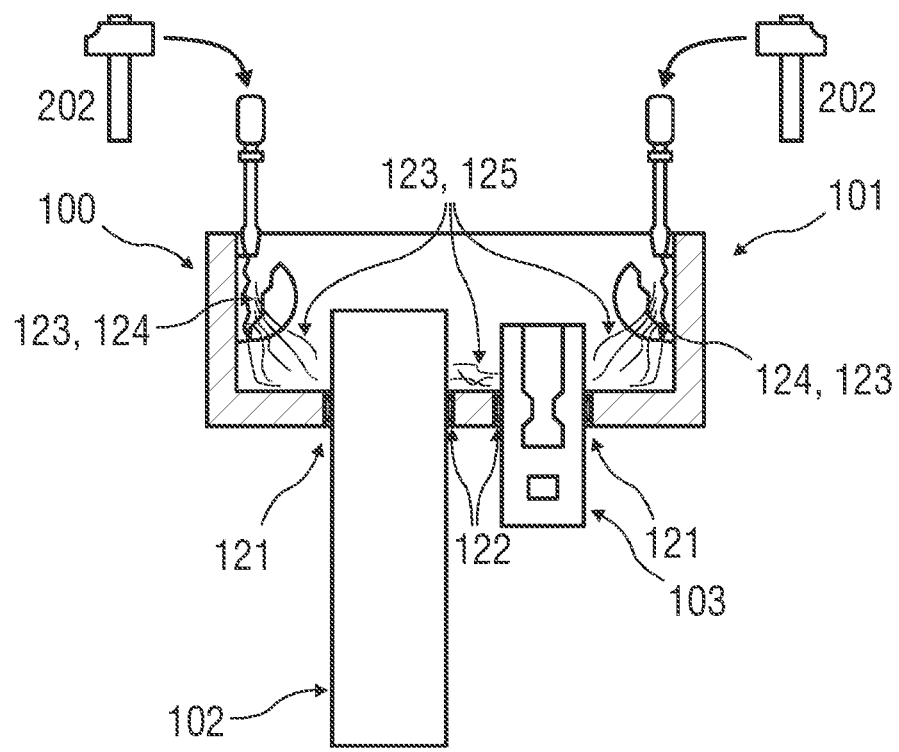
Figure 4C:
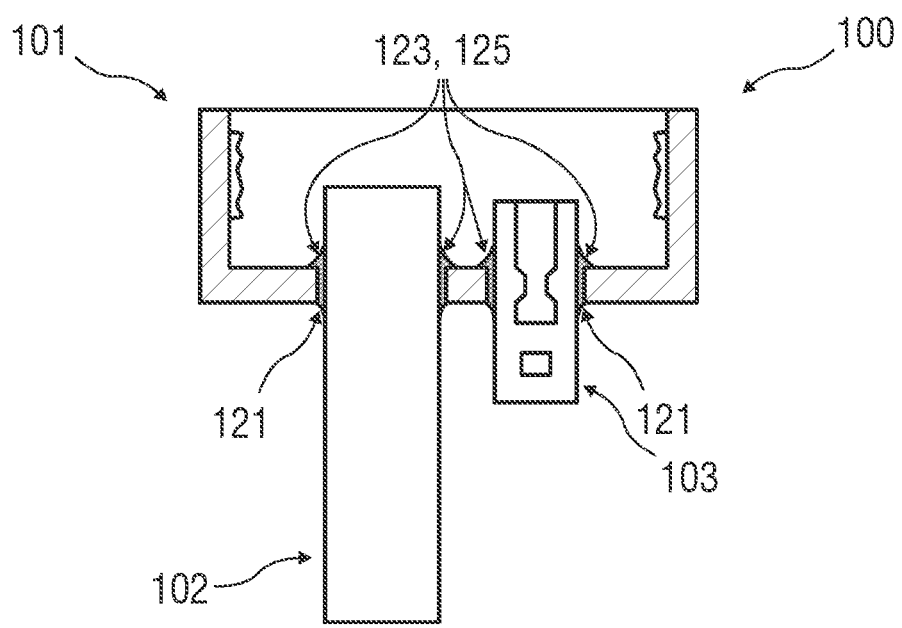

FIGS. 4A to 4C show three sub-steps of an exemplary embodiment of the method of installing an exemplary embodiment of a flow meter 100 at a measuring point 201 of a media line 200. The media line 200 and the measuring point 201 are not shown for reasons of clarity.

In FIG. 4A, a sensor base 101 is provided at a measuring point 201. A bluff body 102 and a sensor body 103 are inserted into sockets 121 of the sensor base 101 and vertically displaced therein until they have reached a respective, desired immersion depth. The sockets 121 are provided with seals 122. A fixing device 123 comprises two reservoirs 124 which are filled with a liquid potting compound 125. The potting compound 125 may be, for example, a two-component potting compound, such that each reservoir 124 holds one of the two components.

Tools 202 are used to break open the reservoirs 124 in FIG. 4B. The potting compound 125 of the fixing device 123 is released and flows into the sockets 121 in which the bluff body 102 and the sensor body 103 are held and sealed by means of the seals 122.

FIG. 4C illustrates how the potting compound 125 has cured in the sockets 121. Bluff body 102 and sensor body 103 are thus rigidly connected to the sensor base 101, and at the same time the sockets 121 are tightly sealed.

Figure 5:
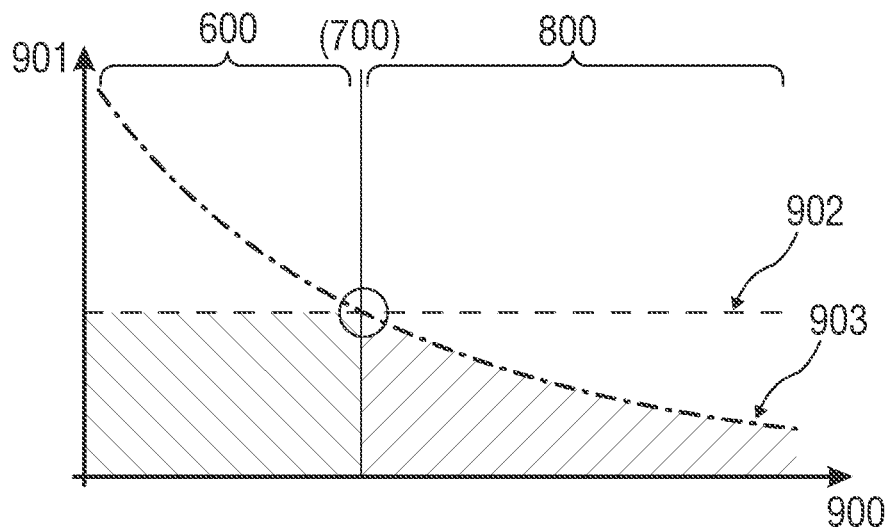
FIG. 5 shows a schematic view of two graphs.
Figure 5:
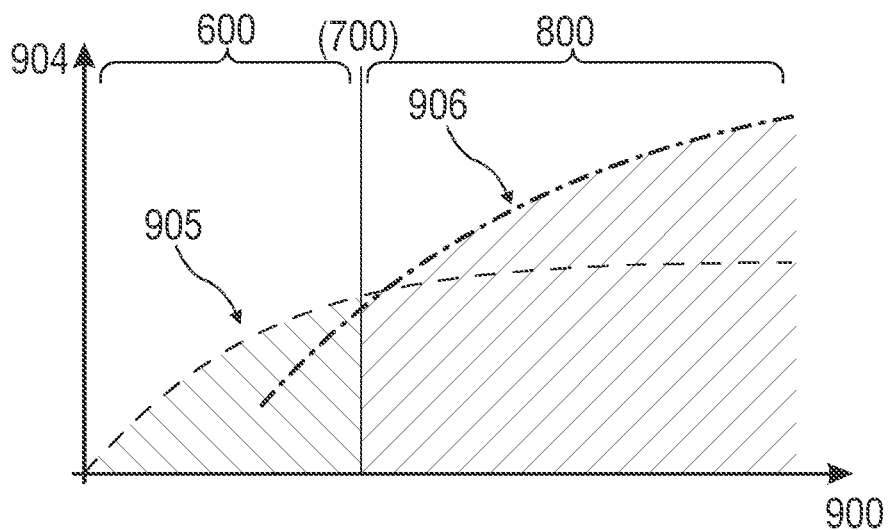

FIG. 5 shows two graphs. In the upper graph, measurement uncertainties 902, 903 are plotted on the ordinate 901 above an abscissa 900, which shows a flow velocity. In the lower graph, sensor signals are plotted on the ordinate 904 above an abscissa 900, which also shows the flow velocity.

In the upper graph, the relative measurement uncertainty 902 of an anemometer sensor unit 104 is plotted together with the relative measurement uncertainty 903 of a vortex meter sensor unit 105. The anemometer sensor unit 104 has a constant relative measurement uncertainty 902, i.e., it has the same relative accuracy with respect to the current measured value over its entire measuring range. The vortex meter sensor unit 105, on the other hand, has a constant measurement uncertainty 903 over its entire measuring range, which is related to the end value of the measuring range.

Accordingly, the relative measurement uncertainty 903 with respect to the respective current measured value becomes smaller and smaller the higher the current measured value, i.e., the flow velocity, is. This shows that it is advantageous to use the sensor signal of the anemometer sensor unit 104 to evaluate a measured value in a first low velocity measuring range 600, while the sensor signal of the vortex meter sensor unit 105 should preferably be selected in a high velocity measuring range 800. In an overlap measuring range 700, the relative measurement uncertainties 902, 903 of both sensor units are approximately equal.

In the lower graph, a signal characteristic 905 of an anemometer sensor unit 104 and a signal characteristic 906 of a vortex meter sensor unit 105 are plotted.

In a low velocity measuring range 600, the signal characteristic 905 of the anemometer sensor unit 104 initially rises sharply but flattens out at higher flow velocities. The signal characteristic 906 of the vortex meter sensor unit 105 can only be used reliably above a certain minimum flow velocity. From this point, however, it shows a continuously increasing curve. In an overlap measuring range 700, both signal characteristics 905, 906 still show a usable slope, but in the high velocity measuring range 800, the signal characteristic 905 of the anemometer sensor unit 104 flattens out considerably.

Figure 6:
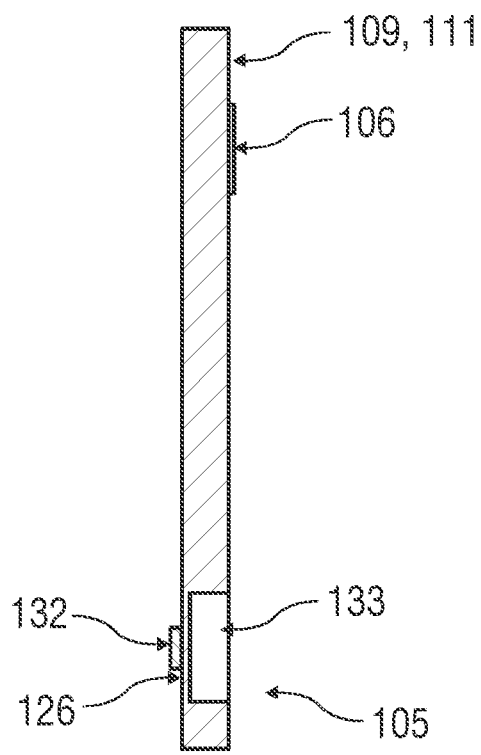
FIG. 6 shows a schematic cross-sectional view of a second ceramic substrate of a substrate arrangement.

FIG. 6 shows a sectional view of a possible embodiment of the second ceramic substrate 109 of a substrate arrangement 111, analogous to the sectional view shown in FIG. 3C.

A first thick-film resistor 106 is disposed at an upper portion of the second ceramic substrate 109. A vortex meter sensor unit 105 is formed on a lower portion of the second ceramic substrate 109.

In contrast to the embodiment in FIG. 3C in which a pressure sensor 113 is arranged above a through-opening 115 in the ceramic substrate 109, the vortex meter sensor unit 105 in this example is formed by the ceramic substrate 109 itself. In this case, a weakening of the material 133 creates a thin membrane 126 which deforms slightly elastically under the pressure fluctuations caused by the passing vortices. A strain-sensitive measuring element 132 arranged on this membrane 126, for example a bonded strain gauge or a resistor track applied by the thick-film process, serves to convert this deformation into an electrically measurable sensor signal.

The invention is not limited to the preceding detailed embodiments. It may be modified to the extent set forth in the following claims. Likewise, individual aspects from the dependent claims can be combined with each other.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A flow meter for determining a flow velocity of a fluid in a media line, the flow meter comprising:
    a sensor base comprising a bluff body and a sensor body, the bluff body being arranged at least substantially upstream of the sensor body in a direction of flow, the sensor body comprising a carrier part and a substrate arrangement having at least one ceramic substrate;
    an electronics unit;
    a signal interface;
    an anemometer sensor unit arranged on the substrate arrangement; and
    a vortex meter sensor unit arranged on the substrate arrangement, the vortex meter sensor unit determining a frequency of the change in direction of a vortex street,
    wherein the anemometer sensor unit comprises:
        a first thick-film resistor for determining a medium temperature of the fluid; and
        a heated thick-film resistor for determining a flow-dependent power output, and
    wherein the first thick-film resistor and the heated thick-film resistor are arranged at a first distance from each other with respect to a vertical longitudinal axis of the sensor body.

2. The flow meter according to claim 1, wherein the vortex meter sensor unit and the anemometer sensor unit are arranged at a second distance from each other with respect to the vertical longitudinal axis of the sensor body, and wherein the vortex meter sensor unit is arranged at an end section of the sensor body that is remote from the sensor base.

3. The flow meter according to claim 2, wherein the heated thick-film resistor is arranged on a first ceramic substrate of the at least one ceramic substrate, the first ceramic substrate having cross-sectional reductions, wherein the cross-sectional reductions are arranged with respect to the vertical longitudinal axis of the sensor body in the region of the first distance and/or in the region of the second distance.

4. The flow meter according to claim 1, wherein the vortex meter sensor unit comprises a pressure sensor, wherein the pressure sensor is formed as a MEMS chip or the pressure sensor is formed as a membrane integrated in the ceramic substrate, at least one strain-sensitive measuring element being arranged on the membrane.

5. The flow meter according to claim 1, wherein the vortex meter sensor unit comprises a pressure sensor, wherein the pressure sensor is arranged on a ceramic substrate of the at least one ceramic substrate which has a through-opening, wherein the pressure sensor is arranged above this through-opening, wherein the sensor body has a clearance so that the pressure sensor acquires a pressure of the flowing fluid through the clearance, and wherein the through-opening and the clearance are sealed with a flexible filling compound.

6. The flow meter according to claim 1, wherein the substrate arrangement comprises a first ceramic substrate and a second ceramic substrate, wherein the heated thick-film resistor is disposed on the first ceramic substrate, wherein the first thick-film resistor and the vortex meter sensor unit are disposed on the second ceramic substrate, and wherein the first and second ceramic substrates are arranged substantially parallel to each other and/or the carrier part is arranged between the first and second ceramic substrates.

7. The flow meter according to claim 1, wherein the at least one ceramic substrate and elements arranged thereon are coated with a protective layer, wherein the protective layer is a thick-film glaze and/or wherein the protective layer is applied by a sol-gel method.

8. The flow meter according to claim 1, wherein the carrier part has recesses on side surfaces thereof, the side surfaces being aligned at least substantially orthogonally to the direction of flow, and wherein the at least one ceramic substrate includes first and second ceramic substrates that are each inserted or pushed into a respective one of the recesses.

9. The flow meter according to claim 1, wherein the sensor base and/or the bluff body and/or the carrier part is/are made of a plastic by injection molding, wherein the plastic is designed to be thermally and electrically insulating and/or is selected from a material class of fiber composites.

10. The flow meter according to claim 1, wherein the electronics unit is set up to detect sensor signals of the anemometer sensor unit and the vortex meter sensor unit and, as a function of the sensor signals, to assign the sensor signals to a low velocity measuring range or to an overlap measuring range or to a high velocity measuring range.

11. The flow meter according to claim 10, wherein the electronics unit is set up to evaluate the sensor signal of the anemometer sensor unit in the low velocity measuring range and provide the sensor signal as a measured value signal via the signal interface, and to evaluate the sensor signal of the vortex meter sensor unit in the high velocity measuring range and provide the sensor signal as a measured value signal via the signal interface.

12. The flow meter according to claim 10, wherein the electronics unit is set up to evaluate the sensor signals of the anemometer sensor unit and the vortex meter sensor unit together in the overlap measuring range and to provide the sensor signals as a resulting measured value signal via the signal interface.

13. The flow meter according to claim 10, wherein the electronics unit is set up to evaluate the sensor signals of the anemometer sensor unit and the vortex meter sensor unit together in the overlap measuring range, and to align the sensor signal of the anemometer sensor unit with the sensor signal of the vortex meter sensor unit and/or to adaptively adjust signal deviations of the anemometer sensor unit to the vortex meter sensor unit in the overlap measuring range for the low velocity measuring range.

14. The flow meter according to claim 1, wherein the electronics unit is set up to evaluate sensor signals of the anemometer sensor unit and the vortex meter sensor unit together and to determine, with the aid of plausibility data stored in the electronics unit, that the anemometer sensor unit is defective or the vortex meter sensor unit is defective, and to output an error signal via the signal interface.

15. The flow meter according to claim 1, wherein the electronics unit is set up to evaluate sensor signals of the anemometer sensor unit and the vortex meter sensor unit together, to receive information about the flow velocity of the fluid via the signal interface, and to calculate a fluid property from the sensor signals and the information about the flow velocity and output the fluid property via the signal interface, and wherein the fluid property is a density, a viscosity or a thermal conductivity of the fluid.

16. The flow meter according to claim 1, wherein the electronics unit is set up to temporarily increase a heating power at the heated thick-film resistor such that the sensor body is at least partially freed from organic deposits.

17. A flow meter for determining a flow velocity of a fluid in a media line, the flow meter comprising;
a sensor base comprising a bluff body and a sensor body, the bluff body being arranged at least substantially upstream of the sensor body in a direction of flow, the sensor body comprising a carrier part and a substrate arrangement having at least one ceramic substrate;
an electronics unit;
a signal interface;
an anemometer sensor unit arranged on the substrate arrangement; and
a vortex meter sensor unit arranged on the substrate arrangement, the vortex meter sensor unit determining a frequency of the change in direction of a vortex street,
wherein the sensor body has, at least in sections, an elliptical or circular cross-sectional contour at least on a side which faces the flow.

18. The flow meter according to claim 1, wherein the sensor base, the bluff body and the sensor body are integrally formed or integrally formed in an injection molding process.

19. A flow meter for determining a flow velocity of a fluid in a media line, the flow meter comprising:
a sensor base comprising a bluff body and a sensor body, the bluff body being arranged at least substantially upstream of the sensor body in a direction of flow, the sensor body comprising a carrier part and a substrate arrangement having at least one ceramic substrate;
an electronics unit:
a signal interface;
an anemometer sensor unit arranged on the substrate arrangement; and
a vortex meter sensor unit arranged on the substrate arrangement, the vortex meter sensor unit determining a frequency of the change in direction of a vortex street,
wherein the sensor base has sockets for receiving and holding the bluff body and/or the sensor body, and wherein the sockets are sealed by seals or by a form fit with respect to the bluff body and/or the sensor body.

20. The flow meter according to claim 19, wherein the bluff body and/or the sensor body is or are displaceably mounted in the sockets relative to the sensor base and at least substantially orthogonally to the direction of flow and at least substantially parallel to a vertical longitudinal axis of the sensor body, and wherein the flow meter comprises a fixing device which rigidly connects the bluff body and/or the sensor body to the sensor base.

21. The flow meter according to claim 20, wherein the fixing device comprises reservoirs which are filled with a potting compound or with a two-component potting compound, and wherein the reservoirs are arranged such that the potting compound or the two-component potting compound flows into the sockets when the reservoirs are broken open and solidifies therein in a sealing manner.

22. A method for installing a flow meter in a media line, the flow meter having a sensor base comprising a bluff body and a sensor body, the bluff body being arranged at least substantially upstream of the sensor body in a direction of flow, the sensor body comprising a carrier part and a substrate arrangement having at least one ceramic substrate, the flow meter further having an electronics unit, a signal interface, an anemometer sensor unit arranged on the substrate arrangement and a vortex meter sensor unit arranged on the substrate arrangement, the method comprising:
arranging the sensor base at a measuring point of the media line;
inserting the bluff body through a socket of the sensor base so that the bluff body extends into the media line, wherein an immersion depth of the bluff body in the media line corresponds at least substantially to a diameter of the media line;
inserting the sensor body through a socket of the sensor base so that the sensor body extends into the media line, wherein an immersion depth of the sensor body in the media line corresponds at least substantially to a radius of the media line; and
fixing the bluff body and the sensor body to the sensor base by a fixing device.

* * * * *